United States Patent [19]

Sumida

[11] Patent Number: 5,303,256
[45] Date of Patent: Apr. 12, 1994

[54] QUASI-MONOLITHIC SATURABLE OPTICAL ELEMENT

[75] Inventor: David S. Sumida, Los Angeles, Calif.

[73] Assignee: Hughes Aircraft Company, Los Angeles, Calif.

[21] Appl. No.: 30,763

[22] Filed: Mar. 12, 1993

[51] Int. Cl.$^5$ .............................................. H01S 3/08
[52] U.S. Cl. ..................... 372/106; 372/99; 372/107
[58] Field of Search .............. 372/11, 42, 99, 106, 372/107, 18

[56] References Cited

U.S. PATENT DOCUMENTS

| | | | |
|---|---|---|---|
| 3,696,310 | 10/1972 | Paoli et al. | 372/18 |
| 4,084,883 | 4/1978 | Eastman et al. | 350/152 |
| 4,104,598 | 8/1978 | Abrams | 331/94.5 |
| 4,875,220 | 10/1989 | Krueger et al. | 372/107 |
| 5,097,481 | 3/1992 | Fritzsche et al. | 372/106 |
| 5,101,415 | 3/1992 | Kolb et al. | 372/99 |
| 5,119,382 | 5/1992 | Kennedy et al. | 372/11 |
| 5,237,577 | 8/1993 | Keller et al. | 372/18 |

OTHER PUBLICATIONS

"Formation, optical properties, and laser operation of F2–centers in LiF", by W. Gellermann et al., in J. Appl. Phys., 61, 1297 (1987).

"Phototropic centers in chromium–doped garnets", by L. I. Krutova et al., in Opt. Spectrosc (USSR), 63,695 (1987).

"Room temperature Q-switching of Nd:YAG by F2--color centers in LiF," presented by D. S. Sumida et al., CLEO, San Francisco, CA, Paper WM5 (1986).

"Room Temperature Laser Action and Q-Switching of F-Aggregate Color Centers in LiF," by S. C. Rand et al., presented at the 5th International Conference on Dynamical Processes in the Excited State of Solids, Lyon, France, Jul. 1-4, 1985.

"Photochromic properties of a gadolinium–scandium–gallium garnet crystal," by E. V. Zharikov et al, Preprint #238, USSR Academy of Sciences, Institute of General Physics, Moscow (1985).

*Primary Examiner*—John D. Lee
*Assistant Examiner*—Robert E. Wise
*Attorney, Agent, or Firm*—M. E. Lachman; M. W. Sales; W. K. Denson-Low

[57] ABSTRACT

Saturable absorption, polarization, and retroreflection are integrated into a single solid-state optical element. The optical element comprises an undoped substrate having front and rear surfaces disposed at a predetermined angle. A dielectric coating is disposed on the rear surface of the substrate, and at least one saturable absorber platelet is disposed on the front surface of the substrate. The saturable absorbing species used in the platelet(s) are either $F_2-$ color-centers in lithium fluoride or $Cr^{4+}$ dopant ions in one of several suitable host optical materials. Linear polarization of the laser beam is achieved by orienting the input face of the optical element at Brewster's angle. The dielectric coating (mirror) on the back surface of the optical element provides 100% reflectivity. The optical element is a monolithic, simple to fabricate, easy to align multi-functional element for use in a laser resonator. The optical element provides passive Q-switching, discrimination for linear polarization, and laser beam reflection. The mirror is an integral part of the optical element, and it is easy to align the integrated polarizer. By aligning the optical element for retroreflection, the Brewster's angle condition is automatically met and optimal polarization discrimination is achieved. The optical element improves the quality and efficiency of lasers in which it is employed. The present invention is easy to align and reduces the number of optical elements in the laser, thereby improving system reliability.

11 Claims, 2 Drawing Sheets

QUASI-MONOLITHIC SATURABLE OPTICAL ELEMENT

BACKGROUND OF THE INVENTION

1. Field of the Invention

The present invention relates generally to solid-state optical elements, and more particularly, to a quasi-monolithic saturable optical element that provides for saturable absorption, polarization, and retroreflection in a single solid-state optical element.

2. Description of Related Art

Each of the individual functions performed by the present invention (saturable absorption, polarization, and retroreflection) is generally well known in the art. Saturable absorbers are well-known in the art. Brewster's angle orientation for polarization selection is well known. Dielectric high reflection coatings can be deposited on substrates without difficulty using conventional practices. Although individual devices exist that perform each of the above functions, the disadvantages and difficulties associated with aligning three functionally different elements are believed to be self-evident.

By way of example, U.S. Pat. No. 4,084,883, entitled "Reflective Polarization Retarder and Laser Apparatus Utilizing Same", issued to Eastman et al. discloses a reflective polarization layer for a laser element. U.S. Pat. No. 4,104,598 entitled "Laser Internal Coupling Modulation Arrangement with Wire Grid Polarizer Serving as a Reflector and Coupler", issued to Abrams discloses a laser having a combined reflector and wire grid polarizer. U.S. Pat. No. 4,875,220 entitled "Laser Tube for Polarized Laser Emission", issued to Krueger et al., has two integrated laser mirrors, and the integrated mirror has a polarizing surface thereon. U.S. Pat. No. 5,097,481 entitled "Gas Laser Having Two Longitudinal Modes of Laser Oscillation", issued to Fritzsche et al. is similar to the Krueger et al. patent. U.S. Pat. No. 5,101,415 entitled "Laser Resonator Mirror with Wavelength Selective Coatings on Two Surfaces", issued to Kolb et al. discloses a laser mirror having reflective surfaces which operate in first and second wavelength modes.

In addition to the above-cited patents, prior work relating to solid-state saturable absorbers is typified by the following publications. An article entitled "Formation, optical properties, and laser operation of $F_2-$ centers in LiF", by W. Gellermann et al., in *J. Appl. Phys.*, 61, 1297 (1987) investigates the formation conditions, optical properties, and lasing behavior of $F_2-$ color centers in LiF crystals. An article entitled "Phototropic centers in chromium-doped garnets", by L. I. Krutova et al., in *Opt. Spectrosc* (USSR), 63, 695 (1987) discusses the use of chromium-doped garnets as passive Q switches. A presentation entitled "Room temperature Q-switching of Nd:YAG by $F_2-$ color centers in LiF," presented by D. S. Sumida et al., CLEO, San Francisco, Calif., Paper WM5 (1986), discusses research on the passive Q-switch properties of $F_2-$:LiF, a color center material of interest for solid-state laser designs because of its saturation behavior at high intensity levels. An article entitled "Room Temperature Laser Action and Q-Switching of F— Aggregate Color Centers in LiF" by S. C. Rand, et al., presented at the 5th International Conference on Dynamical Processes in the Excited State of Solids, Lyon, France, Jul. 1–4, 1985, indicates that passive Q-switching by $F_2-$ centers in gamma-irradiated LiF produced 30 ns Nd:YAG pulses. An article entitled "Photochromic properties of a gadolinium-scandium-gallium garnet crystal," by E. V. Zharikov et al, Preprint #238, USSR Academy of Sciences, Institute of General Physics, Moscow (1985) discusses the photochromic properties of a GSGG:Cr, Nd crystals.

However, the above-cited prior art does not disclose combining three functions (saturable absorption, polarization, and retroreflection) into one element and no such prior art devices appear to exist. Therefore, it is an objective of the present invention to provide a quasi-monolithic saturable optical element that provides for saturable absorption, polarization, and retroreflection in a single solid-state optical element.

SUMMARY OF THE INVENTION

In order to meet the above and other objectives, the present invention provides an optical element for use in a laser resonator having an optical axis along which a laser beam propagates. The optical element provides for saturable absorption, polarization, and retroreflection of the laser beam in an integrated package. The optical element comprises an undoped substrate having front and rear surfaces that are disposed at a predetermined apex angle with respect to each other. The substrate is relatively transparent to the laser beam provided by the laser resonator. A dielectric coating is disposed on the rear surface of the undoped substrate, and at least one saturable absorber platelet is disposed on the front surface of the substrate. The saturable absorber platelet has a front surface that is disposed at Brewster's angle with respect to the optical axis of the laser resonator. Saturable absorption of the laser beam is provided by the optical element using saturable absorber platelet(s); polarization of the laser beam is provided by orienting the front surface of the optical element at Brewster's angle relative to the optical axis of the laser resonator; and retroreflection of the laser beam is provided by the dielectric coating.

The present invention thus integrates three separate optical functions, including saturable absorption, polarization, and retroreflection, into a single solid-state optical element. The saturable absorbing species provided by the platelet(s) are either $F_2-$ color-centers in lithium fluoride or $Cr^{4+}$ dopant ions in one of several suitable host optical materials. Suitable single-crystal host materials may include, for example, yttrium aluminum garnet (YAG), yttrium scandium aluminum garnet (YSAG), yttrium scandium gallium garnet (YSGG), gadolinium scandium aluminum garnet (GSAG), gadolinium scandium gallium garnet (GSGG), gadolinium gallium garnet (GGG), gadolinium indium gallium garnet (GIGG), yttrium orthosilicate (YOS), $Mg_2SiO_4$ (Forsterite), or suitable single crystal combinations of the above. Optionally, the host optical material may be a glassy or amorphous material. The appropriate linear polarization of the laser beam is achieved by orienting the input face of the optical element at Brewster's angle. The deposited dielectric coating (mirror) on the back surface of the optical element provides 100% reflectivity.

The optical element thus comprises a monolithic, simple to fabricate, easy to align multi-functional element for use in a laser resonator. The present invention, in addition to passive Q-switching, discriminates for linear polarization, and serves as a 100% reflecting mirror or reflector. Because the mirror is an integral part of the optical element, a key benefit is the easy alignment of the integrated polarizer. By aligning the optical element for retroreflection as is typically done for a normal incidence 100% reflectivity mirror, the Brewster's angle condition is automatically met and optimal polarization discrimination is achieved. Typically for Brewster's angle elements, the angle of incidence must be optimized individually. In the present invention, that optimization step is not required.

The present invention provides an optical element 10 that improves the quality and provides for a more efficient and compact laser device in which it is employed. Furthermore, the present invention is easy to align and reduces the number of optical elements in the laser device. The reduction in the number of elements provides for improved system reliability.

Combining three functions (saturable absorption, polarization, and retroreflection) into a single optical element overcomes the disadvantages and difficulties associated with aligning three functionally different elements in conventional laser devices. The benefits of the present invention should be apparent when compared to conventional devices and in particular, the relative ease of aligning a single integrated device of the present invention is far superior to techniques employed in conventional devices.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

A laser structure comprises a lasing medium located between a pair of mirrors which define the laser resonator cavity. One mirror reflects substantially all of the laser light and is referred to as the "high reflector" mirror, and the second mirror partially transmits and partially reflects the laser light and is referred to as the "output coupler", as described, for example, in U.S. Pat. No. 5,101,415, previously referenced. In accordance with the present invention, the high-reflector mirror is replaced with and augmented by the multi-functional optical element of the present invention, as described in detail below.

Figure 1:
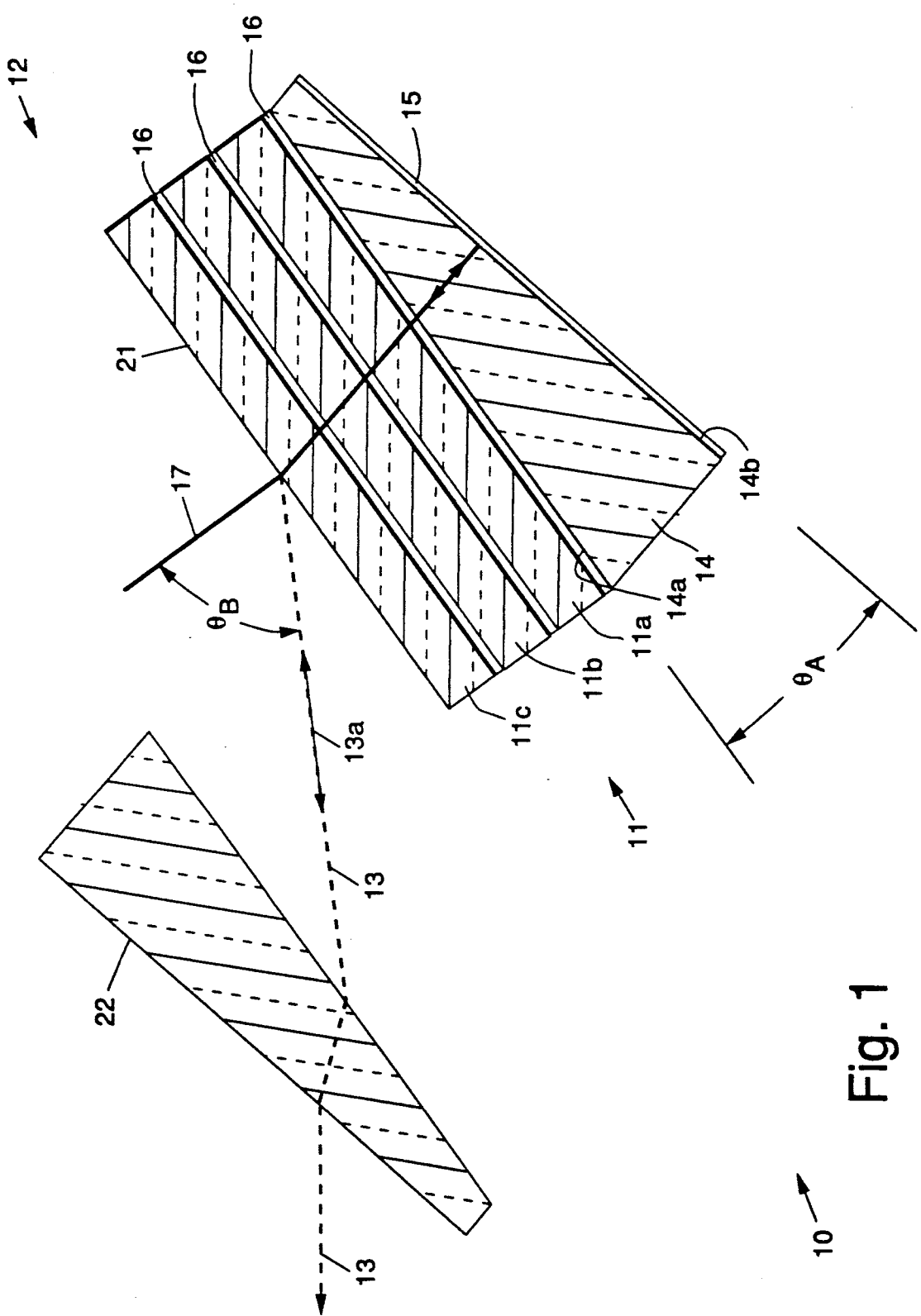
FIG. 1 shows a quasi-monolithic optical element in accordance with the principles of the present invention having an arbitrary number of saturable absorber platelets.

Referring now to the drawing figures, FIG. 1 shows a quasi-monolithic optical element 10 in accordance with the principles of the present invention. The quasi-monolithic optical element 10 is shown having an arbitrary number of saturable absorber platelets 11. The term "quasi-monolithic" is used since the optical element 10 of the present invention is not a single piece, or truly monolithic. The quasi-monolithic optical element 10 is shown disposed at an end of a laser resonator 12, and the optical axis 13 of the laser resonator 12 having a laser beam 13a propagating therealong is also shown.

The quasi-monolithic optical element 10 includes a substrate 14 comprising an undoped host optical material which has approximately the same refractive index as the saturable absorber platelets 11 described below. The substrate 14 is transparent to the laser beam 13a. The substrate 14 is formed in the shape of a wedge having front and rear surfaces 14a, 14b disposed at a predetermined apex angle $\theta_A$ with respect to each other. The substrate 14 has a 100% reflecting dielectric coating 15 disposed on the rear surface 14b thereof. The dielectric coating 15 may comprise a standard multilayer dielectric material, formed of titanium dioxide and silicon dioxide ($TiO_2/SiO_2$) or silicon dioxide and zirconium dioxide ($SiO_2/ZrO_2$), for example, which is deposited on the rear surface 14b using well-known coating deposition techniques.

A plurality of saturable absorber platelets 11a, 11b, 11c are stacked on top of each other and are secured together and to the front surface 14a of the substrate 14 by means of individual layers of optical cement 16, for example. FIG. 1 shows the use of three saturable absorber platelets 11a, 11b, 11c for the purposes of example only. It is to be understood that other numbers of saturable absorber platelets 11 may be employed, including a single platelet 11, depending upon the type of laser resonator 12 and the saturable absorbing species used in the saturable absorber platelet 11. The optical cement 16 is also transparent to the laser beam 13a, and is nominally index-matched to the substrate 14. An optical cement 16 such as an epoxy material that is available from Hartel Enterprises, Pacoima, Calif., may be employed. A normal plane 17 to an exposed surface of the topmost or front saturable absorber platelet 11 is shown, and the optical element 10 is disposed within the laser resonator 12 at an angle $\theta_B$ between the normal 17 and the optical axis 13 of the resonator 12. As is shown in FIG. 1, the angle of incidence of the laser beam 13 at the surface of the dielectric coating 15 is 90°. The definitions and specified values for $\theta_A$ and $\theta_B$ are given below.

The substrate 14 is undoped for two reasons. First, with regard to the $F_2-$ color centers in LiF, for example, these centers anneal away at the elevated temperatures required to provide the hard dielectric coating 15. Second, if the substrate 14 were doped with a saturable absorber species, then its optical density would vary as a function of transverse dimension across the aperture. As a result, the optical element 10 would optically bleach in a spatially nonuniform manner. Consequently, the optical element 10 is constructed in the manner stated above.

The optical element 10 of the present invention provides the integration of three optical functions into a single optical component that can then be aligned in the laser resonator generally indicated at 12, by optimizing the retroreflected return off the high reflectivity rear surface 14b of the optical element 10 provided by the 100% reflecting dielectric coating 15. The integration is accomplished by using the optical cement 16 to fuse one or more saturable absorber platelets 11 to the substrate 14 and to each other to form a single quasi-monolithic element 10.

As was mentioned above, in order for the optical element 10 to exhibit low loss at the interfaces between platelets 11, the optical cement 16 should be index-matched to the substrate 14. For non-index-matched situations, one must trade off the benefit of additional polarization discrimination for increased passive loss.

The detailed aspects of each of the three functions performed by the optical element 10 will now be addressed.

The saturable absorption is accomplished through either the generation of $F_2-$ color centers using electron beam irradiation or the doping of $Cr^{4+}$ in suitable crystals, such as gadolinium scandium gallium garnet, for example, that comprise the saturable absorber platelets 11. More particularly, suitable single-crystal host optical materials for the substrate 14 may include, for example, yttrium aluminum garnet (YAG), yttrium scandium aluminum garnet (YSAG), yttrium scandium gallium garnet (YSGG), gadolinium scandium aluminum garnet (GSAG), gadolinium scandium gallium garnet (GSGG), gadolinium gallium garnet (GGG), gadolinium indium gallium garnet (GIGG), yttrium orthosilicate (YOS), $Mg_2SiO_4$ (Forsterite), or suitable single crystal combinations of the above. Alternatively, the host optical material may be a glassy or amorphous material.

Figure 2:
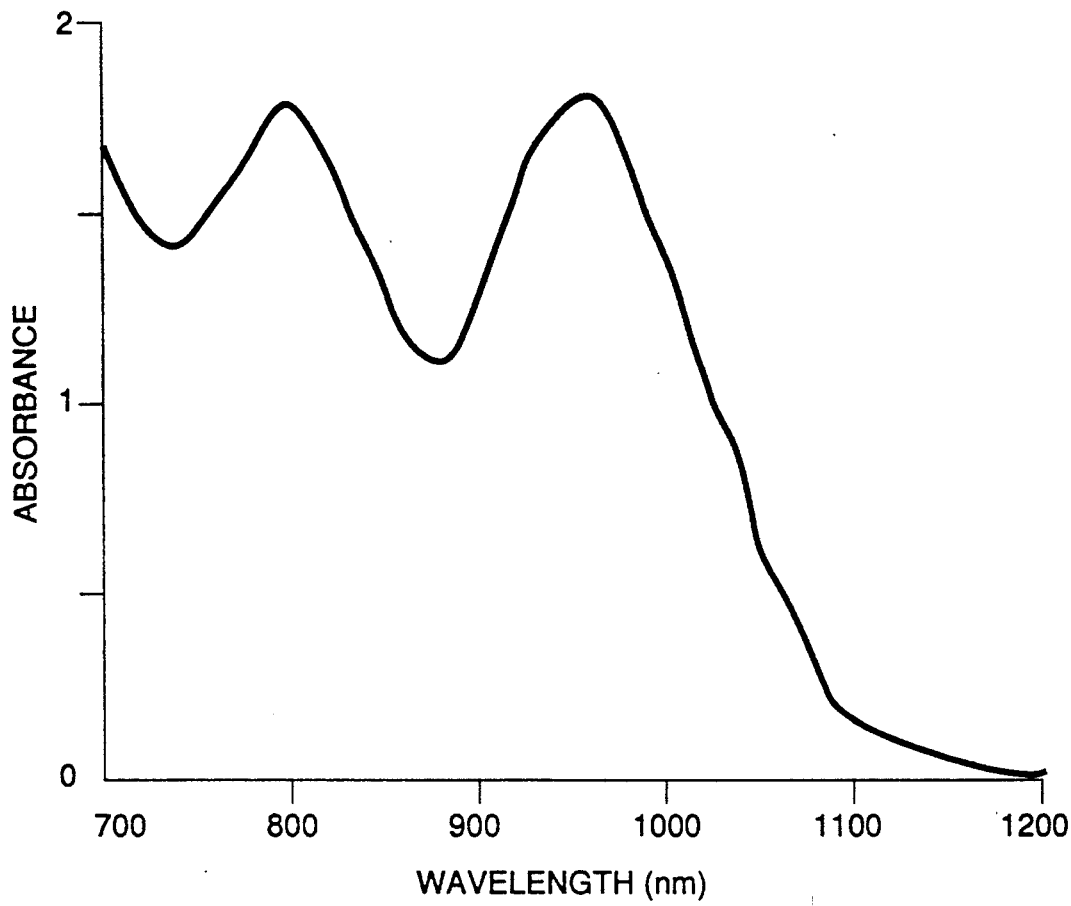
FIG. 2 shows a room-temperature absorbance spectrum of LiF: $F_2-$ color centers.
Figure 3:
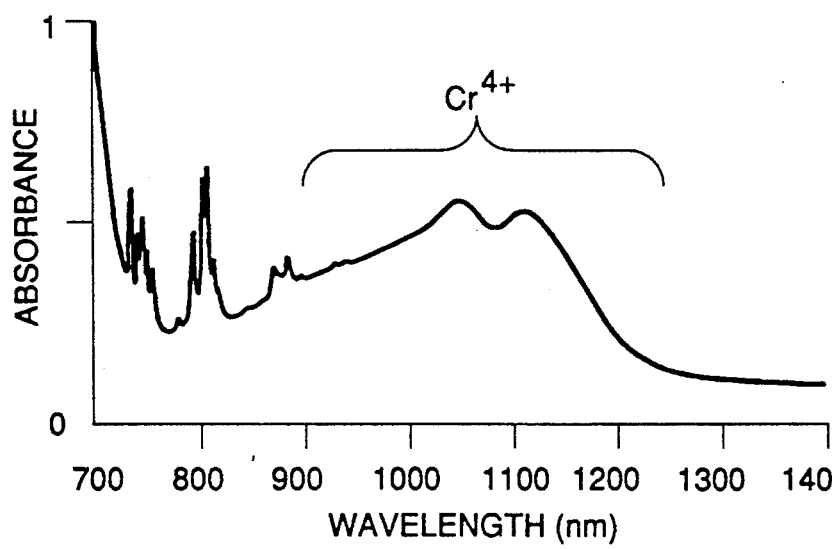
FIG. 3 shows a room-temperature absorbance spectrum of $Cr^{4+}$-doped GSGG.

The fabrication issues associated with $F_2-$ color centers are such that 2–3 mm thick platelets 11 of irradiated LiF provide a maximum optical density per platelet 11. The required total optical density for a particular application is achieved by incorporating greater or fewer platelets 11 into the design of the optical element 10. For $Cr^{4+}$-doped garnets, the nature of the crystal growth process allows for virtually any reasonable optical density to be achieved with a single platelet 11. Both saturable absorber species have demonstrated passive Q-switching at a laser wavelength of approximately one micrometer, and other wavelengths are feasible. The $F_2-$ color center absorption band ranges from about 900–1100 nm while the $Cr^{4+}$ absorption band extends from 900–1200 nm. FIG. 2 shows a room-temperature absorbance spectrum of LiF:$F_2-$ color centers, while FIG. 3 shows a room-temperature absorbance spectrum of $Cr^{4+}$-doped Cr:Nd:GSGG (gadolinium scandium gallium garnet).

The polarization discrimination for linearly polarized laser light is obtained by orienting the front surface 21 of the optical element 10 at Brewster's angle with respect to the optical axis 13 of the laser resonator 12 such that the "p" polarization is transmitted without loss. In practice however, this condition is automatically satisfied when the optical element 10 is optimized for proper retroreflection of the laser beam 13. At 1.06 $\mu$m, for example, the refractive index and Brewster's angle for a LiF substrate 14 are 1.386 and 54.2°, respectively. Similarly, for other garnets, such as gadolinium scandium gallium garnet in particular, the values are 1.94 and 62.7° respectively.

To obtain 100% reflectivity off the rear surface 14$b$ of the optical element 10, the dielectric laser coating 15 is evaporated onto the substrate 14 that comprises an undoped host material, which has approximately the same refractive index as the saturable absorber platelets 11, described above. After the coating process, the coated substrate 14 forms a mirror or reflector that is then fused to the saturable absorber platelet(s) 11 by means of the optical cement 16. The undoped reflector comprising the coated substrate 14 is designed so that, at the proper orientation for retroreflection (i.e. the angle of incidence of the laser beam 13 at the coated surface 14$b$ is 90°), the front surface 14$a$ and hence the front surface 21 of the optical element 10 is automatically aligned at Brewster's angle. In general, the apex angle $\theta_A$ is uniquely defined using simple geometrical arguments and is given by $\sin^{-1}\{\sin\theta_B/n\}$, where $\theta_B$ is Brewster's angle and n is the refractive index of the substrate 14. For platelets 11 comprising LiF and GSGG, $\theta_A$ is 18.4° and 27.3° respectively at $\lambda=1.06$ $\mu$m. In operation, a compensation wedge 22 having the identical composition and apex angle as the substrate 14 may be inserted into the path of the laser beam 13 and having the opposite orientation relative to the substrate 14 (i.e., rotated 180° relative to the substrate) in order to alleviate thermal beam steering effects.

Thus there has been described an improved quasi-monolithic saturable optical element that provides for saturable absorption, polarization, and retroreflection in a single solid-state optical element. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An optical element for use in a laser resonator having an optical axis along which a laser beam is adapted to propagate, and that provides for saturable absorption, polarization, and retroreflection of the laser beam, said element comprising:

an undoped substrate having front and rear surfaces that are disposed at a predetermined apex angle with respect to each other, and wherein the substrate is relatively transparent to the laser beam provided by the laser resonator;

a dielectric coating disposed on the rear surface of the undoped substrate that is adapted to reflect the laser beam;

a saturable absorber platelet disposed on the front surface of the undoped substrate that has a front surface that is adapted to be disposed at Brewster's angle with respect to the optical axis of the laser resonator;

and wherein saturable absorption of the laser beam is provided by the saturable absorber, polarization of the laser beam is provided by orienting the front surface of the optical element at Brewster's angle relative to the optical axis of the laser resonator, and retroreflection of the laser beam is provided by the dielectric coating.

2. The optical element of claim 1 wherein the saturable absorber platelet comprises lithium fluoride (LiF) having $F_2-$ color-centers disposed therein such that the substrate has a predetermined optical density.

3. The optical element of claim 1 wherein the saturable absorber platelet comprises a host optical material having $Cr^{4+}$ dopant ions disposed therein such that the substrate has a predetermined optical density.

4. The optical element of claim 3 wherein the host optical material comprises a single-crystal optical material.

5. The optical element of claim 4 wherein the the single-crystal optical material is selected from the group consisting of yttrium aluminum garnet (YAG), yttrium scandium aluminum garnet (YSAG), yttrium scandium gallium garnet (YSGG), gadolinium scandium aluminum garnet (GSAG), gadolinium scandium gallium garnet (GSGG), gadolinium gallium garnet (GGG), gadolinium indium gallium garnet (GIGG), yttrium orthosilicate (YOS), $Mg_2SiO_4$, and single crystal combinations thereof.

6. The optical element of claim 3 wherein the host optical material comprises a glassy optical material.

7. The optical element of claim 1 wherein the undoped substrate comprises a material having approximately the same refractive index as the saturable absorber platelet.

8. The optical element of claim 1 wherein the dielectric coating comprises multiple layers of titanium dioxide and silicon dioxide.

9. The optical element of claim 1 wherein the dielectric coating comprises multiple layers of silicon dioxide and zirconium dioxide.

10. The optical element of claim 1 which comprises a plurality of saturable absorber platelets stacked on top of each other and secured together and to the front surface of the substrate by means of individual layers of optically transparent cement.

11. The optical element of claim 1 that further comprises a compensation wedge disposed along the optical axis and which comprises an undoped substrate having front and rear surfaces that are disposed at the predetermined apex angle, and wherein the compensation wedge has an opposite orientation with respect to the substrate.

* * * * *